(12) United States Patent
Jindal et al.

(10) Patent No.: US 11,075,977 B2
(45) Date of Patent: Jul. 27, 2021

(54) ACCURATELY DETERMINING WEB PAGE VISUALLY COMPLETE TIME

(71) Applicant: Cisco Technology, Inc., San Jose, CA (US)

(72) Inventors: Shubham Jindal, Bangalore (IN); Kalyan Kumar Sai, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 16/440,484

(22) Filed: Jun. 13, 2019

(65) Prior Publication Data
US 2020/0304557 A1    Sep. 24, 2020

(30) Foreign Application Priority Data

Mar. 19, 2019  (IN) .............................. 201941010613

(51) Int. Cl.
*G06F 15/16*  (2006.01)
*H04L 29/08*  (2006.01)
*H04L 12/26*  (2006.01)

(52) U.S. Cl.
CPC ............ *H04L 67/025* (2013.01); *H04L 43/04* (2013.01); *H04L 67/101* (2013.01)

(58) Field of Classification Search
CPC .. G06F 11/3419; G06F 11/3495; H04L 43/04; H04L 67/025; H04L 67/101
See application file for complete search history.

(56) References Cited

U.S. PATENT DOCUMENTS

| 7,330,887 | B1 | 2/2008 | Dharmadhikari | |
|---|---|---|---|---|
| 7,600,014 | B2 | 10/2009 | Russell et al. | |
| 8,903,894 | B2 | 12/2014 | Dillon | |
| 9,177,077 | B2 | 11/2015 | Eidson et al. | |
| 10,038,736 | B2 | 7/2018 | Veeravalli et al. | |
| 2007/0271375 | A1* | 11/2007 | Hwang ............... | G06F 11/3419 709/224 |
| 2011/0029393 | A1* | 2/2011 | Apprendi ............ | G06F 11/3419 705/14.73 |
| 2016/0267060 | A1 | 9/2016 | Skirpa et al. | |

OTHER PUBLICATIONS

International Search Report dated Jun. 24, 2020 in connection with International Application No. PCT/US2020/021814.
"Visually complete metric", Dynatrace LLC, https://www.dynatrace.com/support/doc/appmon/user-experience-management/how-does-uem-work/visually-complete/, Oct. 28, 2019, 6 pages.

\* cited by examiner

*Primary Examiner* — Normin Abedin
(74) *Attorney, Agent, or Firm* — Behmke Innovation Group LLC; James M. Behmke; Jonathon P. Western

(57) ABSTRACT

In one embodiment, a monitoring process identifies a plurality of media elements added inside a viewport of a webpage, and calculates a render time of each of the plurality of media elements. After determining a load completion time of the webpage, the monitoring process may then determine a particular media element of the plurality of media elements that rendered last in the viewport before the load completion time based on the calculated render times. Accordingly, the monitoring process may then establish that a visually complete time (VCT) of the webpage is a corresponding render time of the particular media element that rendered last in the viewport.

20 Claims, 13 Drawing Sheets

|      | START TIME | RESPONSE END | RENDER AT | DURATION | RENDER | ALPHA |
|------|------------|--------------|-----------|----------|--------|-------|
| IMG1 | 650 | 1899 | 1900 | *1249 (1899-650)* | *1250 (1900-650)* | *1250/1249* |
| IMG2 | 650 | 1986 | 1987 | *1336 (1986-650)* | *1337 (1987-650)* | *1337/1336* |
| BG   | 900 | 3000 | X | *2100 (3000-900)* | *?* | |

FIG. 11

US 11,075,977 B2

ACCURATELY DETERMINING WEB PAGE VISUALLY COMPLETE TIME

RELATED APPLICATION

This application claims priority to Indian Provisional Patent Application No. 201941010613, filed Mar. 19, 2019, entitled ACCURATELY DETERMINING WEB PAGE VISUALLY COMPLETE TIME, by Jindal et al., the contents of which are hereby incorporated by reference in their entirety.

TECHNICAL FIELD

The present disclosure relates generally to computer networks, and, more particularly, to accurately determining web page visually complete time.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In one particular example, "visually complete time" (VCT) is a point in time when a browser has finished loading/rendering content in the viewport (content within the first screen of a particular user device). Visually complete time has traditionally been computed synthetically (e.g., in labs), since it required taking screenshots while the page is being loaded and analyzing when the rendering is stabilized in the viewport by comparing screenshots using image processing. However, this technique is generally an inaccurate calculation for web page loads for real users in real-world environments, and especially are inaccurate with regard to moving objects such as sliders, animations, carousels, etc.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 11 illustrates an example chart of measurable durations and renderings, and their corresponding "alpha" coefficient.

DESCRIPTION OF EXAMPLE EMBODIMENTS

Overview

Figure 1A:
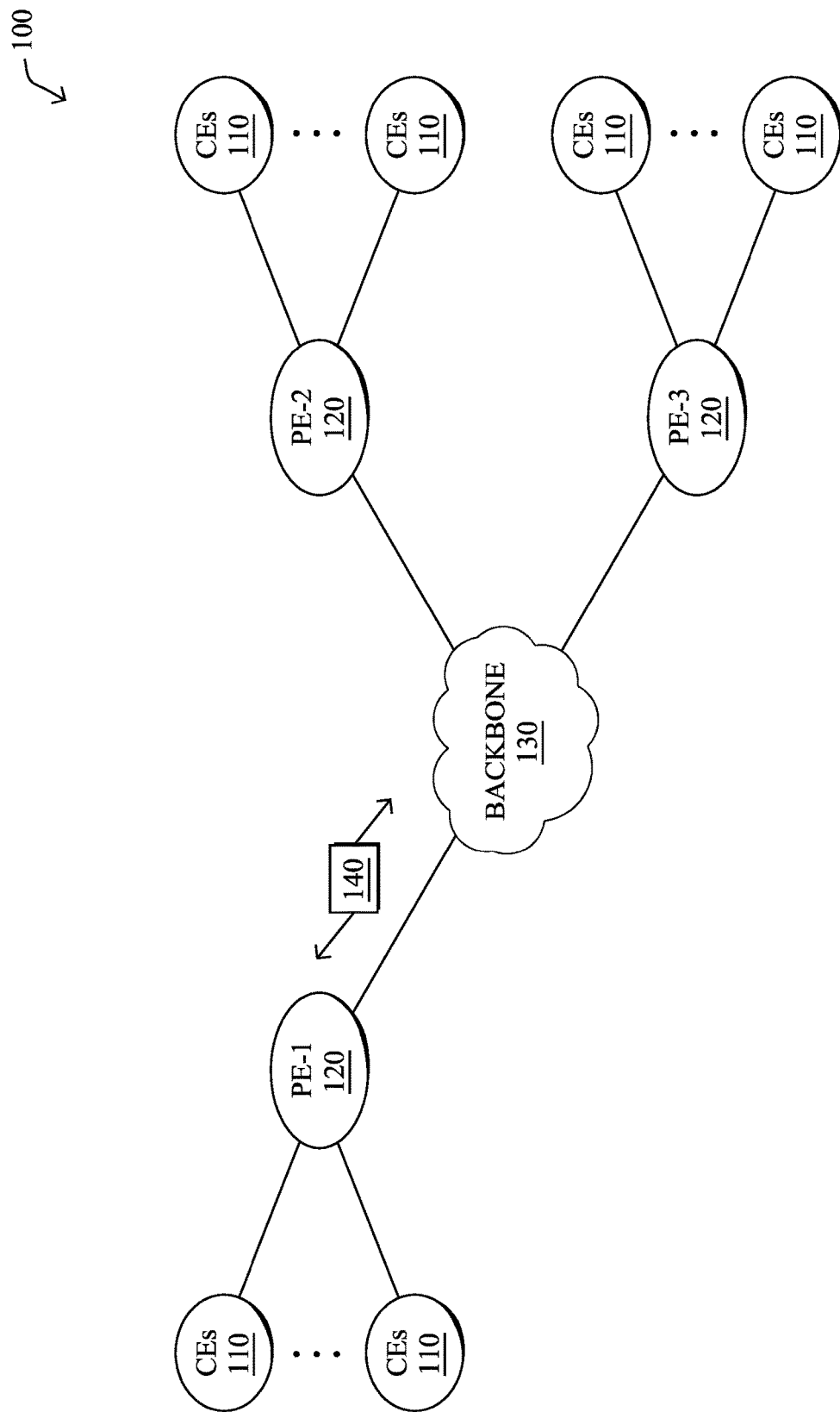
FIGS. 1A-1B illustrate an example computer network.

According to one or more embodiments of the disclosure, techniques herein accurately determine web page visually complete time, particularly for real users, and specifically provide an accurate visually complete time when resources to which load handlers cannot be attached (e.g., background images, etc.) are present. Specifically, in one embodiment, a monitoring process identifies a plurality of media elements added inside a viewport of a webpage, and calculates a render time of each of the plurality of media elements. After determining a load completion time of the webpage, the monitoring process may then determine a particular media element of the plurality of media elements that rendered last in the viewport before the load completion time based on the calculated render times. Accordingly, the monitoring process may then establish that a visually complete time (VCT) of the webpage is a corresponding render time of the particular media element that rendered last in the viewport.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
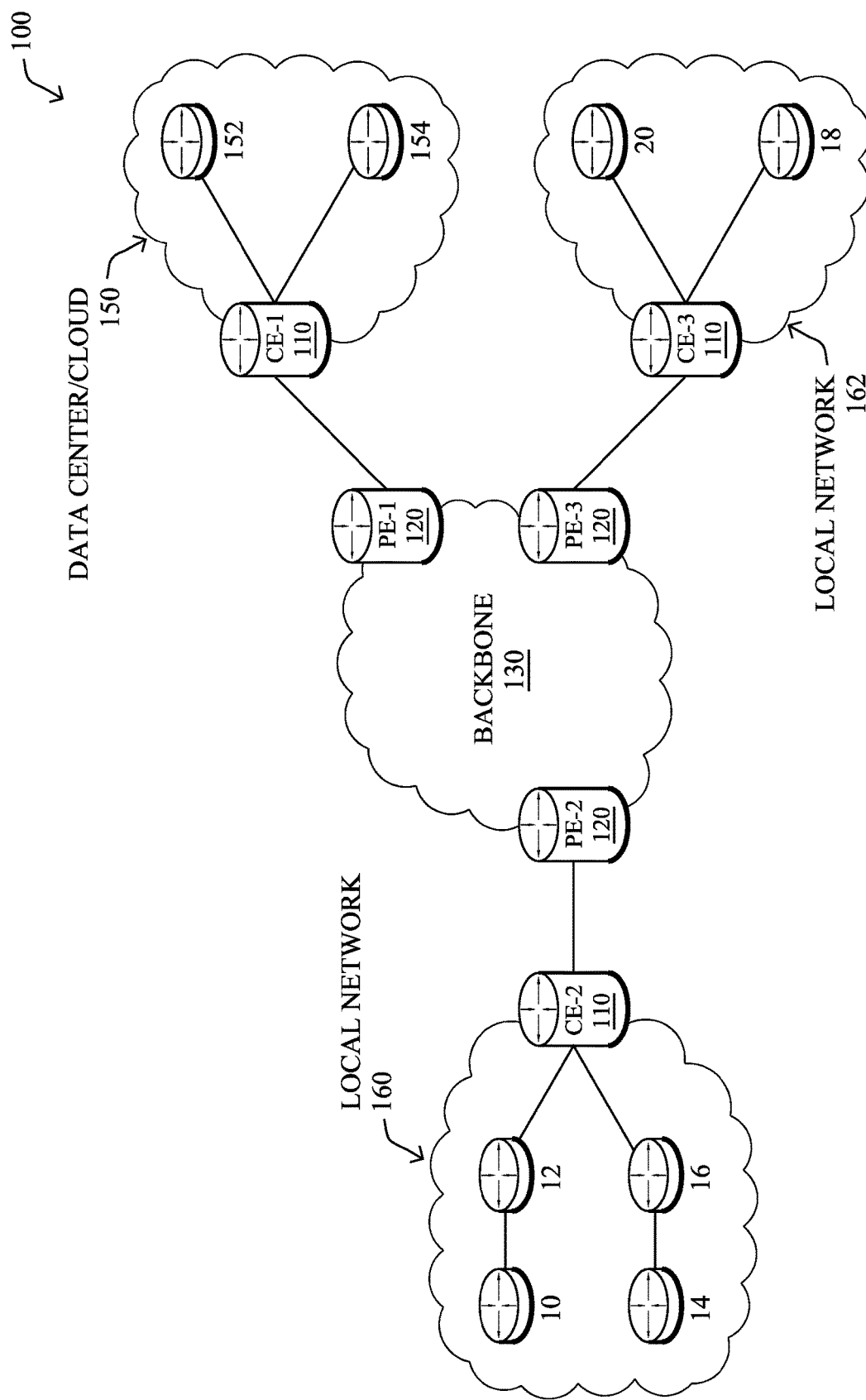

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
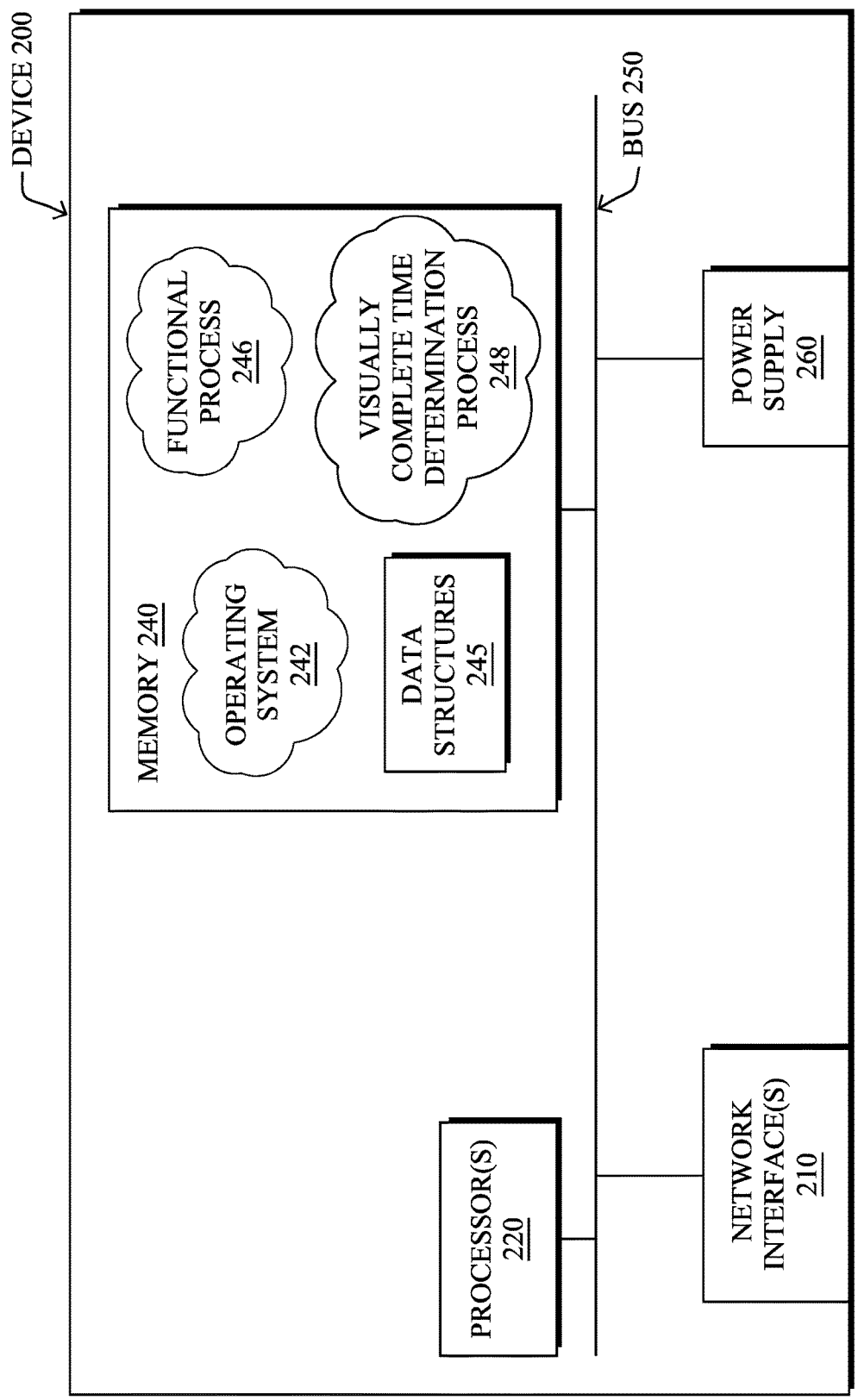
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "visually complete time determination" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
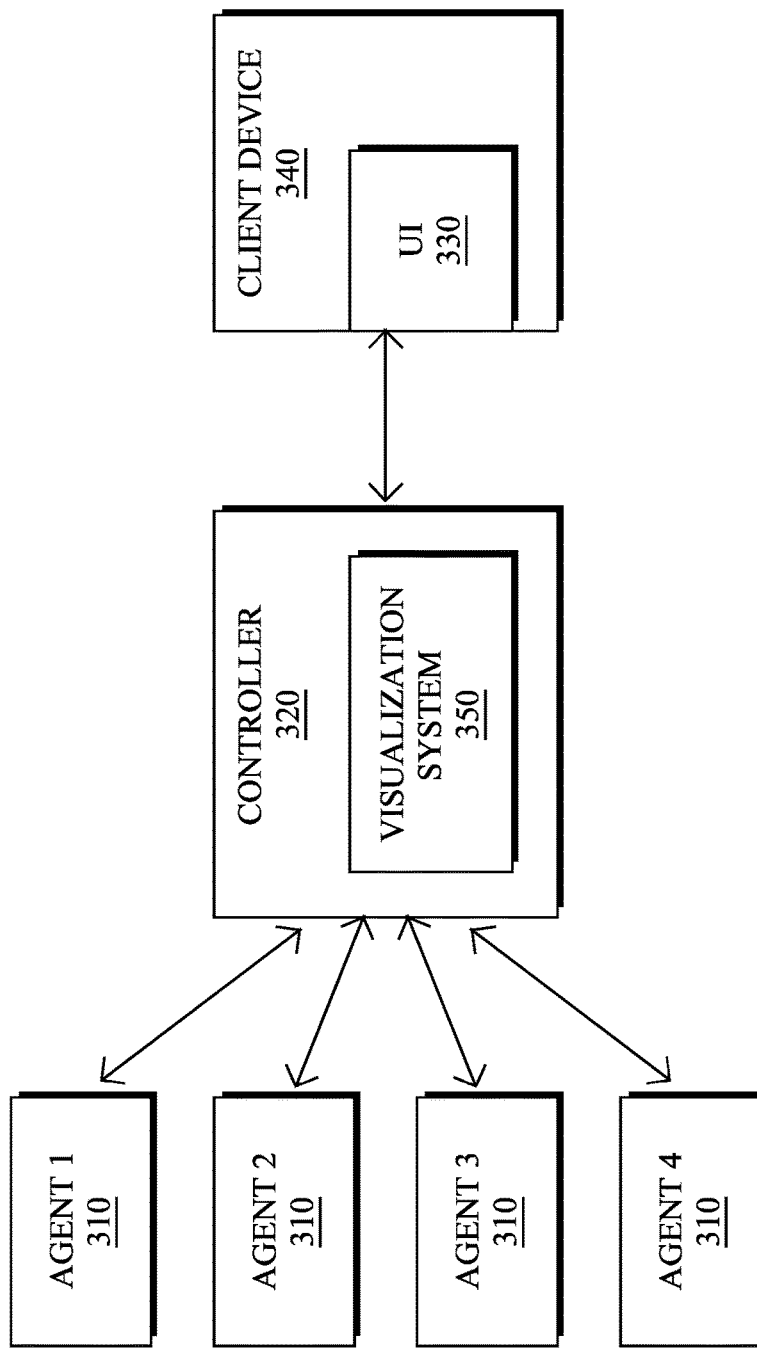
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM processor/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides is information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
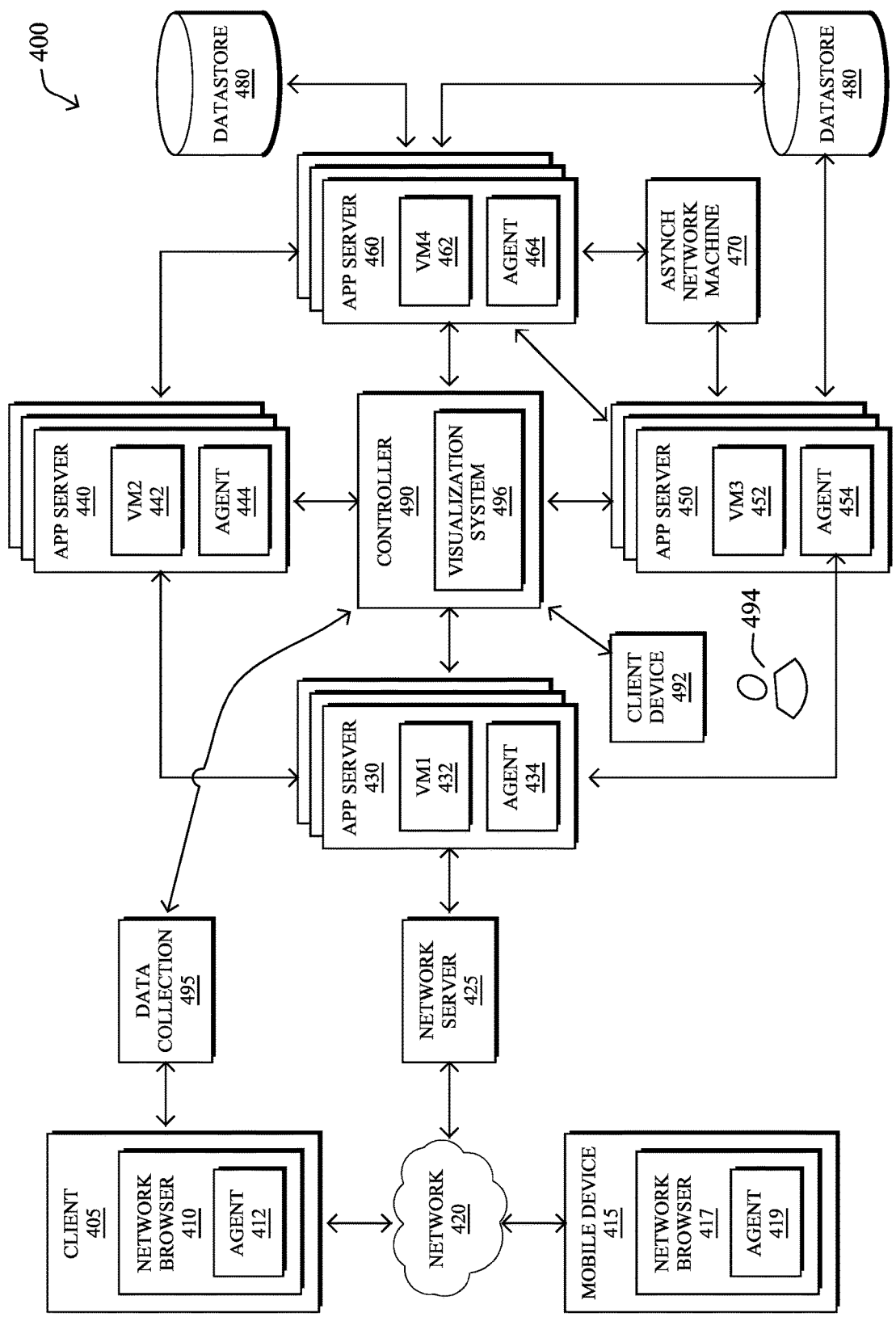
FIG. 4 illustrates an example system for implementing the example application intelligence platform.

FIG. 4 illustrates an example application intelligence platform (system) 400 for performing one or more aspects of the techniques herein. The system 400 in FIG. 4 is includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform.

Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, workstation or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
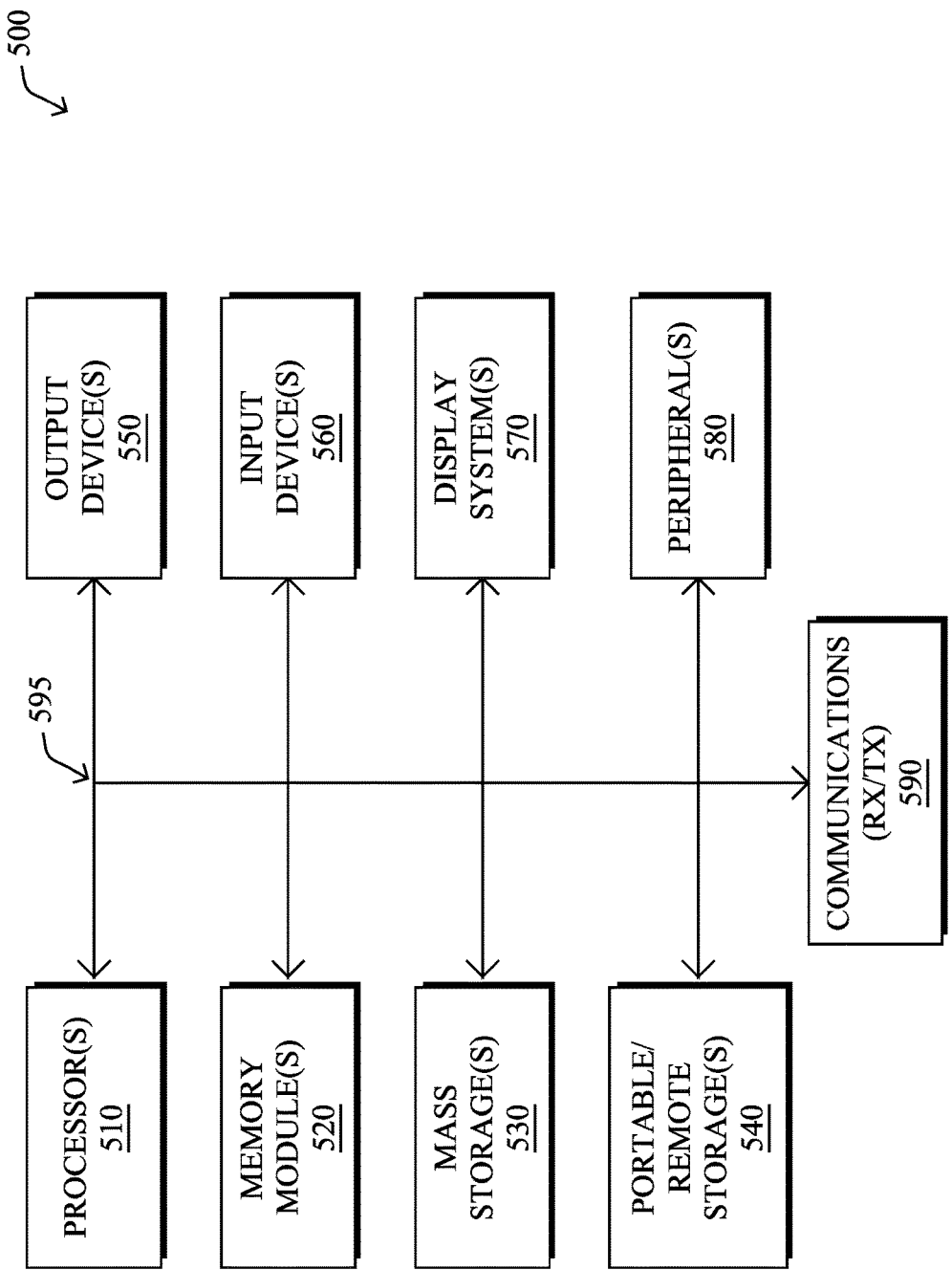
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, handheld computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smartphone or tablet computer, the computer system 500 of FIG. 5 may include one or more antennas, radios, and other circuitry for communicating over wireless signals, such as for example communication using Wi-Fi, cellular, or other wireless signals.

—Accurately Determining Web Page Visually Complete Time—

Web pages may be monitored using various types of Browser Real User Monitoring (BRUM) products (e.g., agents, as described above), which report performance data about the page and its resources, such as JavaScripts (JS), Stylesheets (CSS), images, etc. In particular, Java Script Agents ("JSAgents"), as mentioned above, may be configured to collect and reports performance data about web pages and their resources, such as JS, CSS, images, etc.

Load Time ("onLoad"), for example, is a metric obtained when a browser fires an event onLoad when a web page is completely loaded. The onLoad time is traditionally described as the time at which all of the objects in the document are in the Document Object Model (DOM) (a programming interface for HTML and XML documents that represents the page so that programs can change the document structure, style, and content), and all the images, scripts, links, and sub-frames have also finished loading.

As mentioned above, "visually complete time" (VCT) is a point in time when a browser has finished visually loading/rendering content in the viewport (content within the first screen of a particular user device). Unfortunately, to date, there has been no way to accurately determine visually complete time for real users. That is, as also noted above, visually complete time has conventionally been computed in synthetic labs through the acquisition of screenshots while a page is being loaded, and then analyzing when the rendering is completed in the viewport by comparing screenshots using image processing. However, this technique not only requires intensive image processing, but it is inapplicable to real-world computation, and does not generate an accurate calculation for real users, which can have many variable and influences affecting individual load times.

The techniques herein, however, accurately determine web page visually complete time. In particular, as described below, the techniques herein use JavaScript and Web fundamentals to compute the value on real user browsers, specifically including accurate calculations for resources to which load handlers cannot be attached (e.g., background images, etc.).

Specifically, according to one or more embodiments described herein, a monitoring process identifies a plurality of media elements added inside a viewport of a webpage, and calculates a render time of each of the plurality of media elements. After determining a load completion time of the webpage, the monitoring process may then determine a particular media element of the plurality of media elements that rendered last in the viewport before the load completion time based on the calculated render times. Accordingly, the monitoring process may then establish that a visually complete time (VCT) of the webpage is a corresponding render time of the particular media element that rendered last in the viewport.

Figure 6:
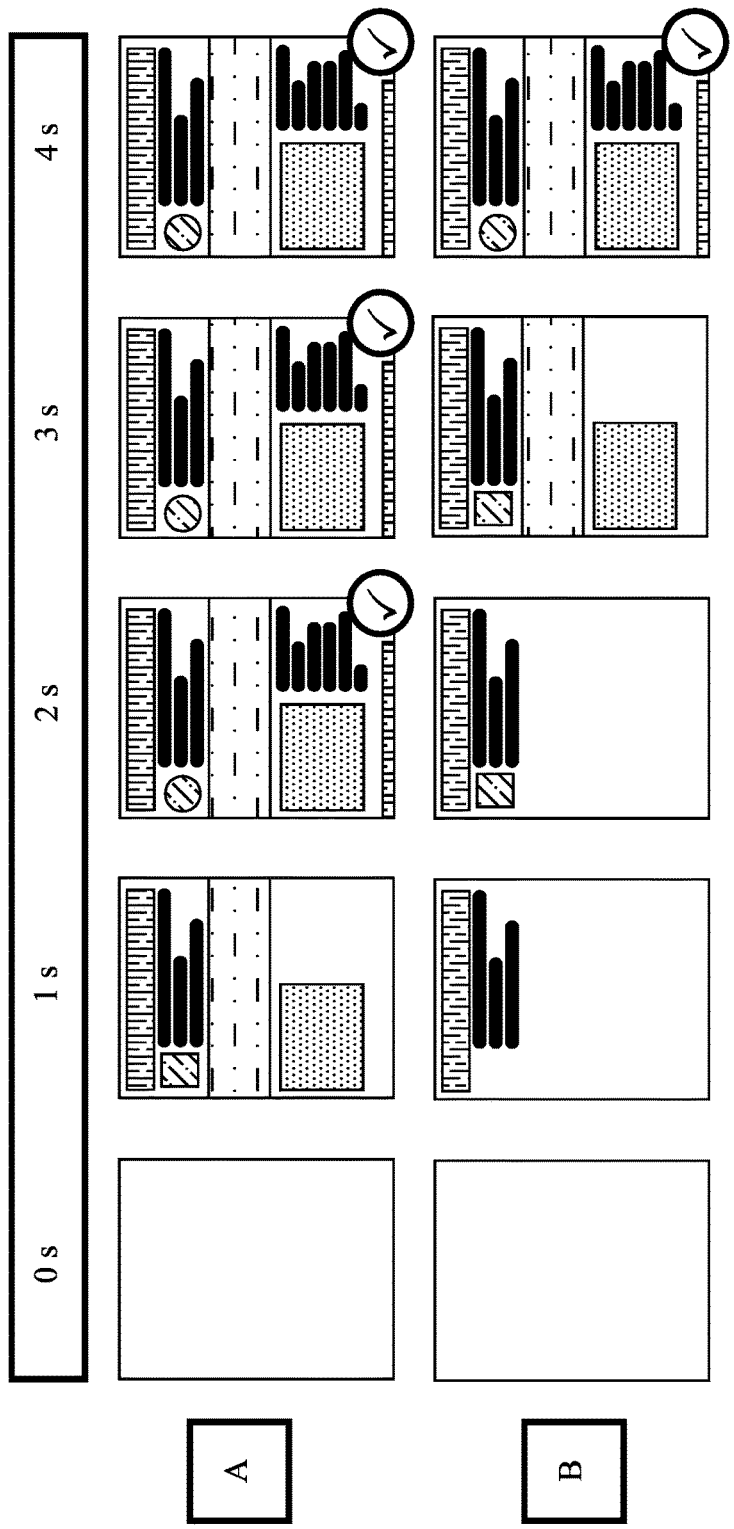
FIG. 6 illustrates an example of visually complete times of example web pages.

As an illustration of visually complete time, FIG. 6 illustrates an example comparison 600 of two web pages "A" and "B" over a four-second load time. As shown, visually complete time (indicated by a check mark) for web page A, i.e., the time at which all elements are shown on the viewport, is at 2 seconds, whereas the visually complete time for web page B is at 4 seconds.

Operationally, a web page generally consists of two types of elements: media and text. There are many media elements such as images, scalable vector graphics (SVGs), videos, embeds, fonts, icons, etc. Notably, since media elements are "heavy" and take more time to render as compared to text, the rendering of text generally be ignored initially. (Note that the techniques herein do address the rendering of text, as described further below.)

According to the embodiments herein, in order to compute visually complete time, the rendering time of media elements within the viewport must be computed. In other words, visually complete time is the time taken for only those media elements to render that are in the viewport, ignoring media elements outside of the viewport. In order to determine those elements that are in the viewport, therefore, the techniques herein define the coordinates of the viewport and determine those elements within those coordinates. In particular, Javascript provides a manner to find rectangular coordinates of any element rendered in the web page. Also, the rectangular coordinates (corners) of the viewport are defined as:

(0, 0) (window.width, 0) (0, window.height) (window.width, window.height).

Figure 7:
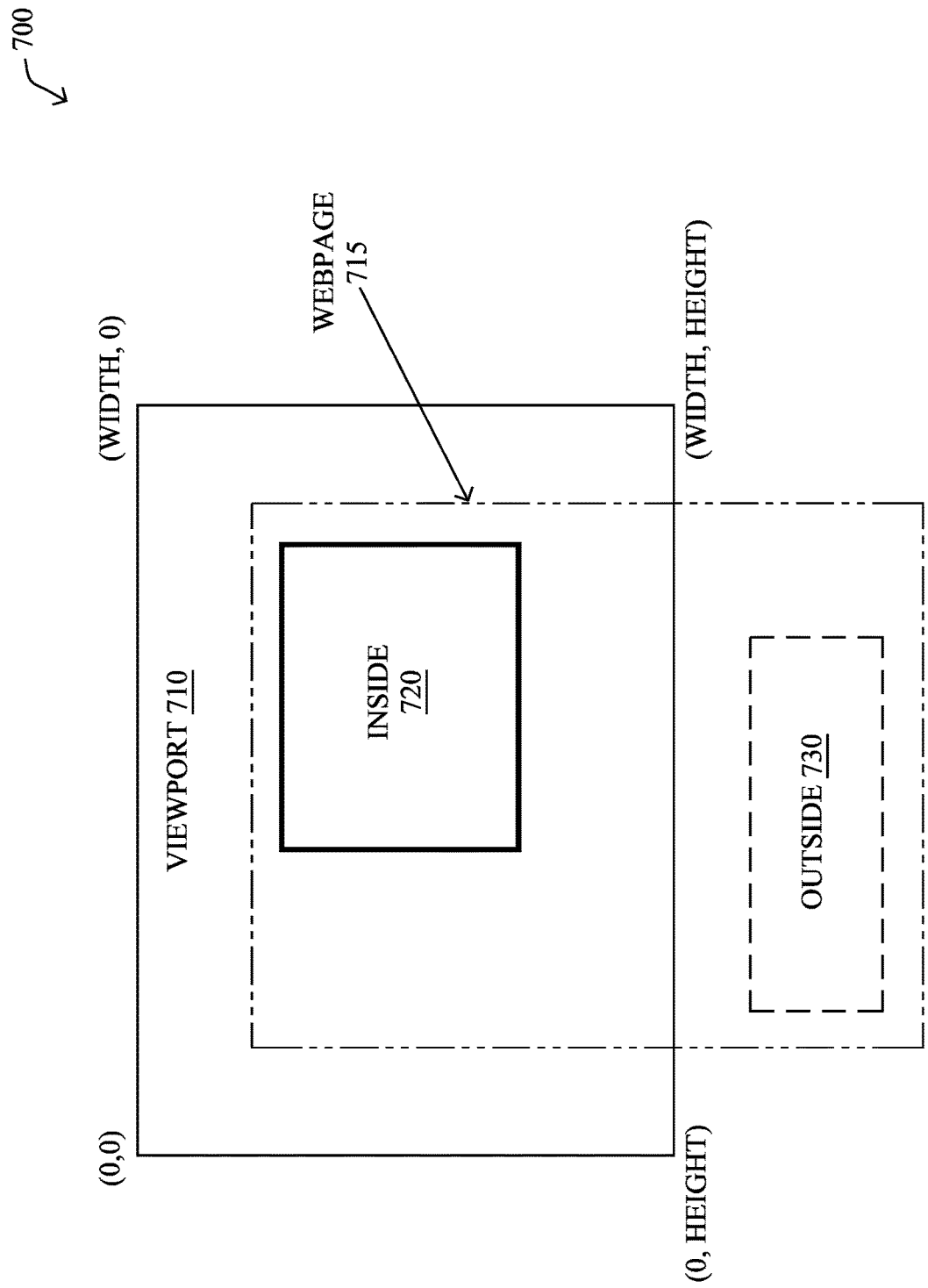
FIG. 7 illustrates an example of a viewport of a web page.

Since the absolute rectangular coordinates of every rendered element on the page can be determined, and since the techniques herein also know the absolute rectangular coordinates of the viewport, the elements within the viewport can correspondingly be determined. An example of this is illustrated in FIG. 7, showing web page environment 700 with a viewport 710, and a webpage 715 having elements 720 within the viewport and elements 730 outside the viewport, accordingly.

Notably, for elements which partially intersect the viewport, some threshold of visibility within the viewport may be set for consideration as either inside or outside the viewport. For example, elements which have>=20% of their area within the viewport may be considered entirely in the viewport. (20% is derived from experiments, but the fraction can be adjusted accordingly as desired, and this is not meant to be limiting to the present disclosure.)

To find rendering time of an element, it is important to note that media elements such as images, videos, SVGs, etc. have a load event, which gets fired (triggered) when that particular media element is rendered on the page. Assume, for example, an image (img) is being rendered, and the techniques herein can track the load time of the image by adding a handler on the load event:

```
img.addEventListener('load', function( ) {
    // img rendered
});
```

To compute visually complete time, the JSagents described above (or other BRUM agents) listen to different nodes being added/modified in DOM (web page), and add a load handler for every media element added on the page. In addition, the techniques herein compute the rectangular co-ordinates when a load handler of an element is triggered. If the element lies within the viewport, the techniques herein consider the element (inside the viewport, element 720) and note the time. Otherwise, the techniques herein ignore the element (an outside element 730, since it does not contribute to VCT).

According to the present disclosure, at network and DOM activity idleness, or other measure of web page load completion time, the techniques herein find the element which loaded the last, based on knowing the load times for every element in the viewport. The time at which the last element is loaded in the viewport is used to compute the visually complete time.

Network idleness, in particular, may be used to compute VCT since network idleness is the safest point in time for a web page—when everything has settled down and no more activity will take place for some period. Hence, network idleness is used to find the render time of the element which loaded the last. Note that instead of network idleness, a quiet period can also be used to compute VCT. That is, if there is no activity happening in the viewport for some threshold amount of time (e.g., 4-5 seconds), then the techniques herein can say that the viewport is visually complete. (Note that 4-5 seconds is also derived from experiments as an average expectation of no further activity to occur after such a time, but this threshold can also be adjusted accordingly as desired, and this is not meant to be limiting to the present disclosure.)

An example technique for determining the load time of a web page, including for single page applications (SPAs), the techniques herein track all of the resources (direct and dynamic resources) loaded on the page and wait for network inactivity. Once the network is inactive for a threshold amount of time, the time at which network started being inactive can be set/declared to be the "actual load time". Notably, an SPA, in particular, is a web browser application that interacts with a user by dynamically rewriting a current web page rather than loading entire new pages from a server. In an SPA's first load, all necessary code to construct the web application is retrieved in an initial single page load, then additional code, data, and resources (dynamic resources) can be loaded by "XMLHttpRequest" requests (XHRs) (XML—Extensible Markup Language; HTTP—Hypertext Transfer Protocol). After that, page transitions will simply be content changes through XHR requests or memory state changes. Because these are not full page loads, they are generally referred to as "virtual pages" or "virtual pageviews".

To track resources loaded on the page the techniques herein may add "hooks" (e.g., event loggers using a JSAgent in DOM) to track any image, script, css (stylesheet), etc. added as a direct resource anytime on a page. The hooks then attach a load listener to each of these resources, such that when a load listener gets invoked, the techniques herein note the load timestamp of that resource (i.e., the time at which the resource completed loading or rendering). Accordingly, the resource having the latest/max load timestamp is the last resource to be loaded/rendered on the page.

Figure 8:
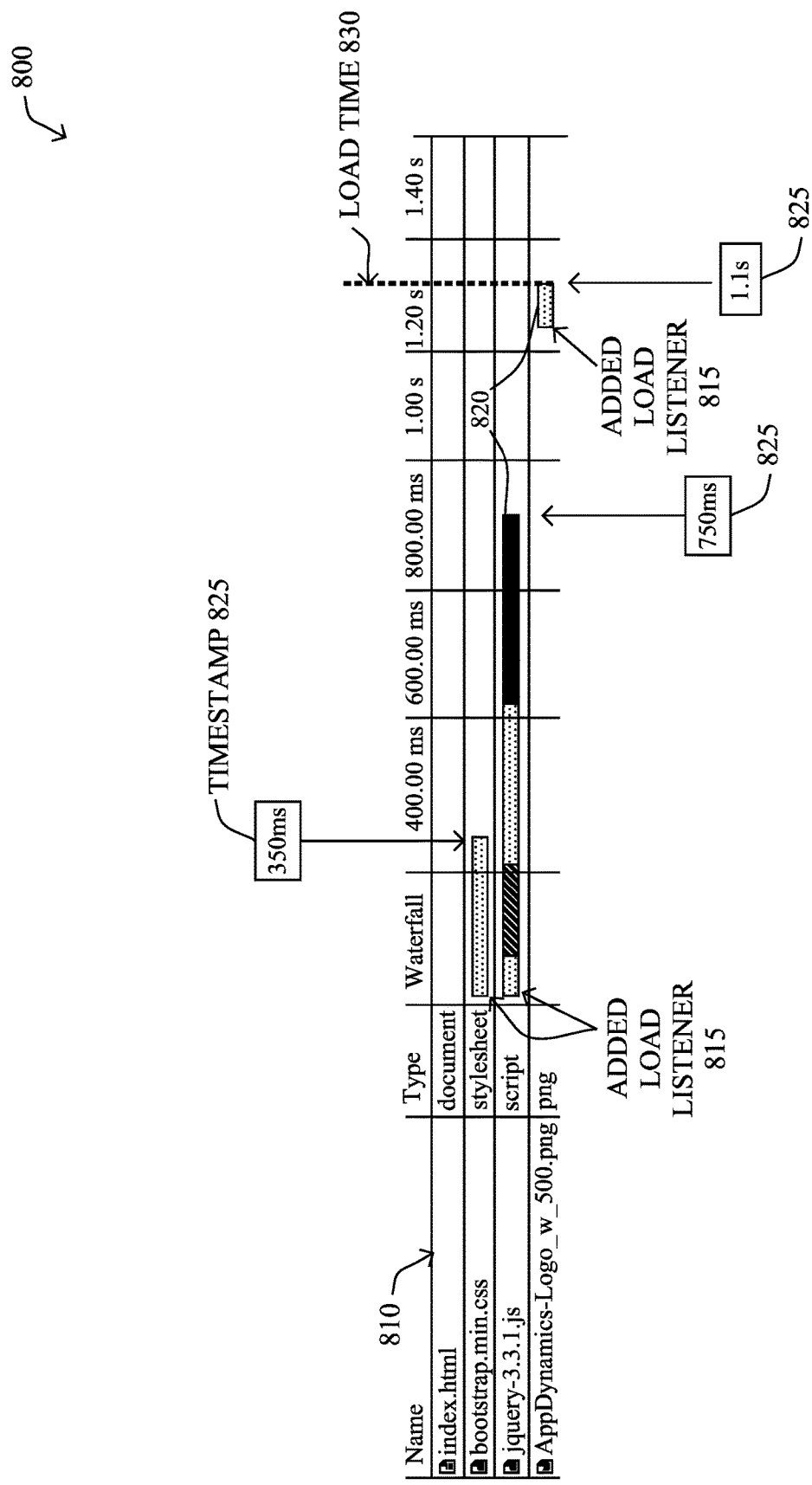
FIG. 8 illustrates an example of load listener load times for resources.

The illustrative algorithm can be better explained with reference to FIG. 8, showing a time-chart 800 of direct resources 810 loading on a page. In particular, hooks (e.g., added by JSAgent in DOM) track scripts, stylesheets, and images being added to the page (resources 810), which add a load listener 815 upon the resource being added to page. When the load listener is invoked for any resource after some associated timing 820 of the loading/rendering of the resource, the techniques herein note the timestamp 825 of that resource. As mentioned above, the maximum timestamp (latest time) among all of the timestamps is the direct resource load time 830 of the page.

As shown in the example 800, therefore, load listeners have been added to resources when they are added in DOM:
bootstrap.min.css loaded at 350 ms;
jquery-3.3.1.js loaded at 780 ms; and
AppDynamics-Logo_w_500.png loaded at 1.1 s.
Since 1.1 s is the max timestamp among all the direct resources, the direct resource load time 830 ("830-DR") for this page is illustratively set/declared to be 1.1 seconds according to the techniques herein.

Notably, however, since XHRs may also be used by SPAs to load resources and data for the website, an algorithm is also considered herein to track XHRs (or other dynamic resources), similarly to the direct resource tracking above. (Note that in certain embodiments, the direct and dynamic resources may be tracked by the same algorithm.) In particular, hooks may also be added (e.g., by the JSAgent) to track firing and loading of XHRs. That is, when any XHR is loaded, note the timestamp 825, and the max timestamp among all the timestamps is the XHR load time ("830-XHR"). (Note further that there may be no need to add a load listener for XHRs, because XHRs loading can directly be tracked by adding hooks to the XHR "load" function, as may be appreciated by those skilled in the art.)

According to the techniques herein, a web page or SPA Load Time can be computed as the maximum of the load times of the direct and dynamic resources, that is:

Load Time=max (Resource Load Time, XHR Load Time) Eq. 1.

One important consideration, however, is how to determine when to stop tracking the resources to determine the "last" loaded resource. According to one or more embodiments of the techniques herein, a determination of network inactivity may be used as an appropriate assumption of page completion (or alternatively, page failure). That is, when there is a network inactiveness of some set (or dynamically determined) threshold of time (e.g., 4-5 seconds, or other value determined whether through experimentation, monitored maximums, machine learning determination, and so on), the techniques herein may stop tracking and compute the Load Time under the generally valid assumption that the page is loaded (or has failed or stalled).

Figure 9:
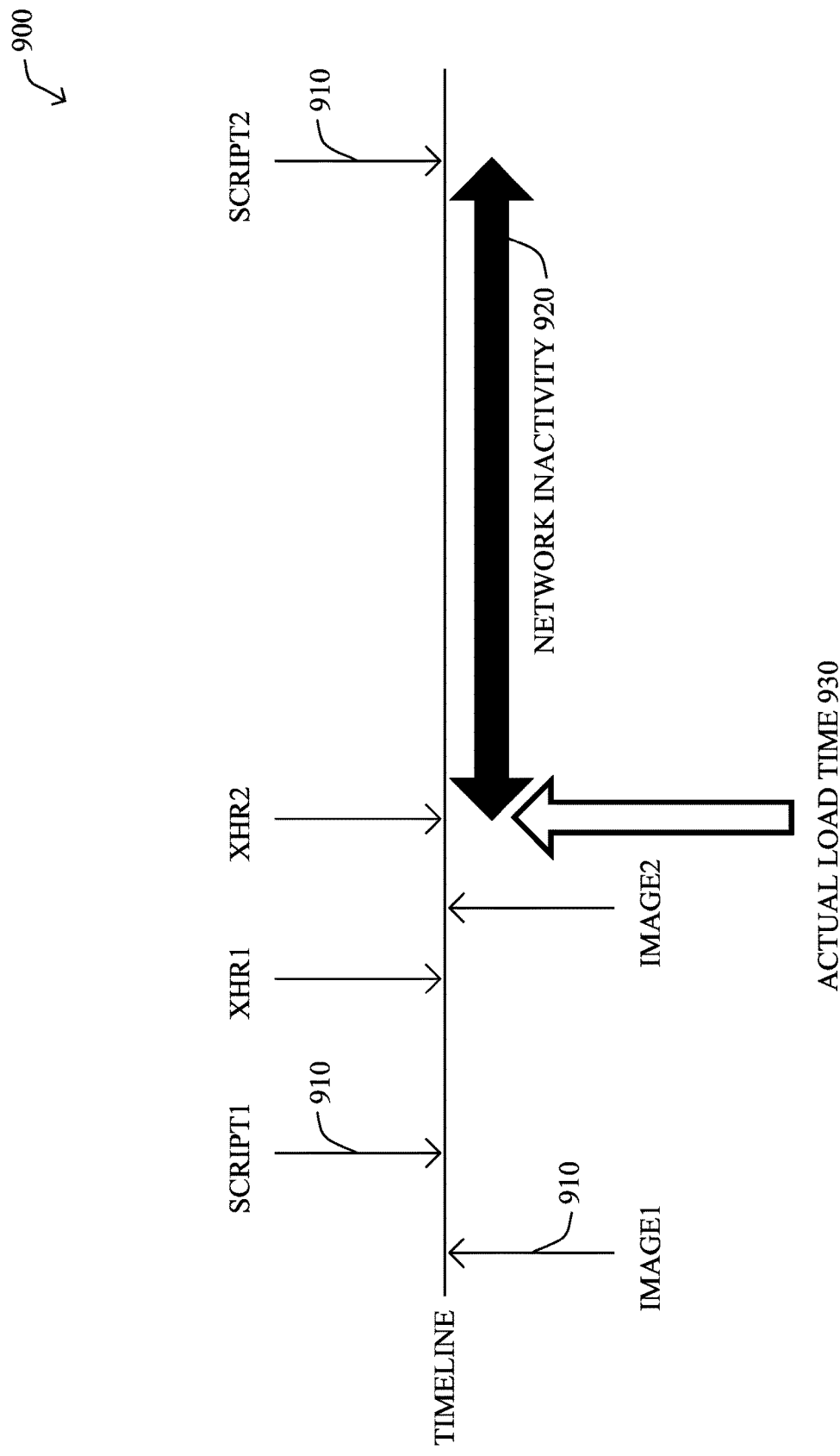
FIG. 9 illustrates an example of a determination of load/end times of a web page.

FIG. 9 illustrates an example timeline 900 showing a collection of resource load times 910 (e.g., Image1, Script1, XHR1, Image2, XHR2, and then eventually, Script2). Since there is a large gap in the timeline (that is, there is a period of time 920 with no load times or any other monitored activity occurring, where that period of time is longer than the threshold length of time, e.g., for 4-5 seconds), notably between XHR2 and Script2, the techniques herein classify that time span 920 as network inactive time. Accordingly, the techniques herein dictate that the actual load time 930 is the time when XHR2 (the max load timestamp time) has loaded on the page prior to reaching that network inactive time 920.

According to the embodiments herein, it is important to specifically point out how resources to which load handlers cannot be attached (e.g., using background images as a non-limiting example of one such resource) create added complexity to the algorithms thus far described. In particular, background images are not added to DOM directly, as will be appreciated by those skilled in the art. Instead, they are added to the web page in other manners (e.g., background images using CSS), and thus do not have a load event (and no load handler). Hence, it is impossible to directly find the time taken to render a background image or other resources to which load handlers cannot be attached (e.g., background images, etc.). The techniques herein, therefore, determine how long a resource took to load (its render time), without a load handler.

In particular, a Resource Timing API can enumerate detailed information about all the resources being loaded in the page. It has information like name, startTime, duration, and many other milestones required to load a resource. Based on extensive research, it has been determined that there exists a correlation between render time and duration of loading a media element:

Duration(d) is the time taken to download the resource (notably only the time taken to download and not render);

Render Time(r) is time taken to render the resource; and $r$=alpha*$d$ Eq. 2.

Figure 10:
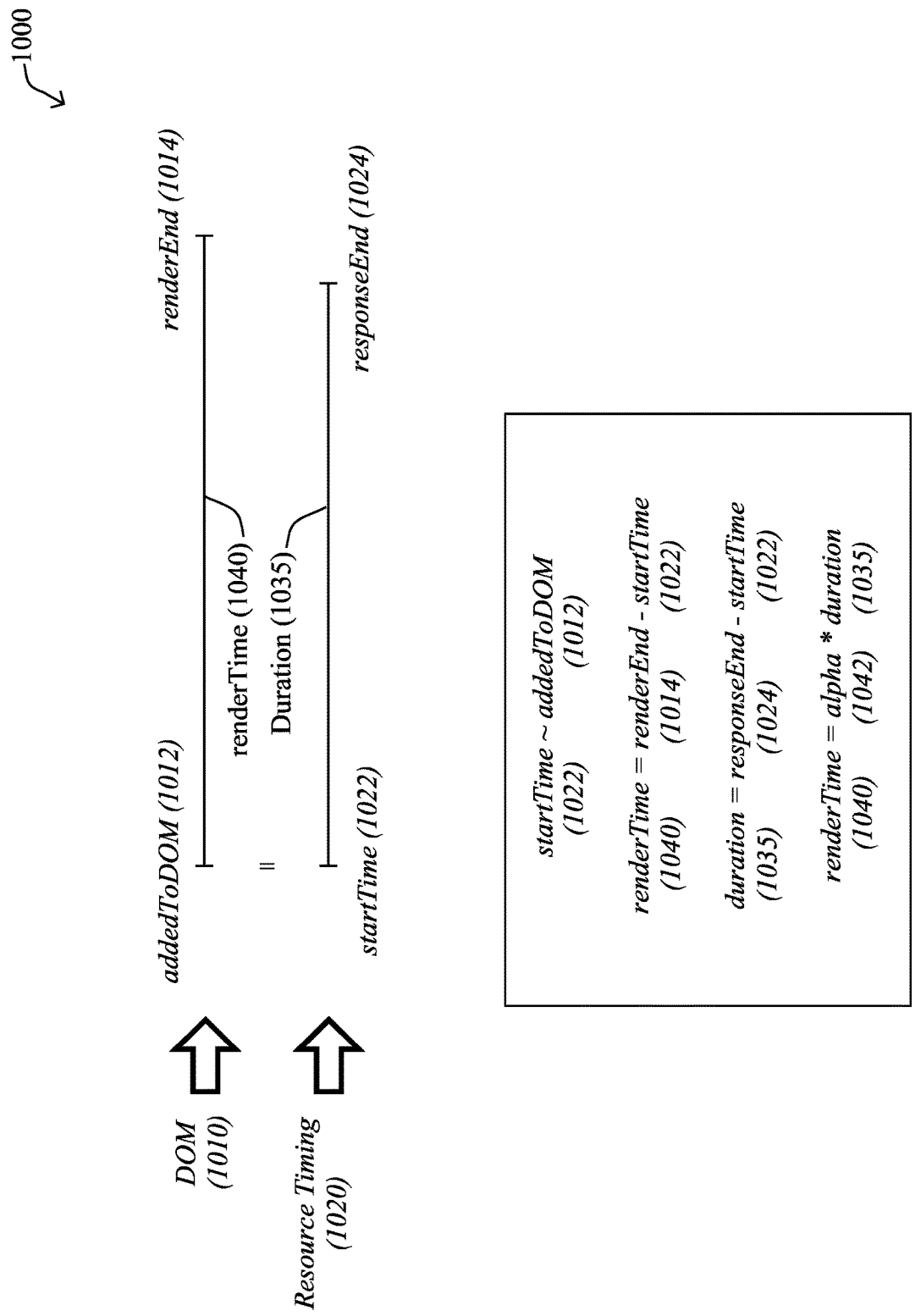
FIG. 10 illustrates an example of timing correlation between DOM and Resource timing.

The time graph (ref. 1000) of FIG. 10 (where "ref." in this paragraph implies a general reference number in FIG. 10, to avoid confusion with being actual calculated numbers) further illustrates this concept, where the DOM timing (ref. 1010) and Resource Timing (ref. 1020) are correlated. In particular, it has been determined that:

Resource Timing startTime (ref. 1022) is approximately equal to the addedToDOM time (ref. 1012);

The renderTime (ref. 1040) is the difference between renderEnd (ref. 1014) and startTime (ref. 1022); and Duration (ref. 1035) is the difference between responseEnd (ref. 1024) and startTime (ref. 1022).

As determined herein, the renderTime (ref. 1040) (renderEnd (ref. 1014) minus addedToDOM (ref. 1012), which is approximately equal to the startTime (ref. 1022)) is also generally equal to the duration (ref. 1035) multiplied by some alpha value (ref. 1042). As shown below, this determination allows for determining render times for resources to which load handlers cannot be attached.

The Resource Timing API provides the duration of every resource. Thus, the techniques herein need to find alpha in order to find render time (r) for every resource. By experimentation, it has been seen that alpha is mostly in the range [1, 2] and in most instances, it is close to 1.

Since there are other media elements on the page like DOM images (images which are added to DOM directly using <img> tags, videos, etc.), the techniques herein can find render time of such resources. The techniques herein can also use Resource Timing API to find duration of such resources. The problem to solve, therefore is to find the value of alpha to be used for the other "unmeasurable" resources.

Given:

Render time (r) of other media elements using load handler.

Duration (d) of media elements using Resource Timing API.

Solution:

Since r=alpha*d is generally valid for every resource on the page, the techniques herein can find alpha for every individual measurable media element on the page and average it out to get the final alpha for the web page.

As an example, and with reference generally to chart 1100 of FIG. 11 (with values in milliseconds), assume that there are two DOM images ("img1" and "img2") and a background image ("bg") (that is, one particular example resource to which load handlers cannot be attached):

r1: render time for img1, d1: duration of img1;
r2: render time for img2, d2: duration of img2; and
r3: render time for bg, d3: duration of img3.

The values for r1, r2 (i.e., every media element on the web page except for background images or other resources to which load handlers cannot be attached) are known using load events (load handlers) on img1 and img2. Also, the values for d1, d2, and d3 (i.e., every media element on the page) can be determined from the Resource Timing API. According to the techniques herein, then:

alpha=avg($r1/d1+r2/d2$) Eq. 3;

$r3$=alpha*$d3$ Eq. 4.

According to the techniques herein, alpha can be calculated using all the measurable media elements on the page and not only using the media elements in the viewport. (Notably, alpha is like a render property of a page and generally holds true for every media element on the page.) Based on the example of FIG. 11, alpha can be calculated precisely as:

alpha=(1250/1249+1337/1336)/2=1.00077457; and
render(bg)=1.00077457*2100=2101.6266.

Note that depending upon the level of accuracy required by implementation design, alpha can be simplified (e.g., rounded to tenths or hundredths, etc.), and as such, the calculation could also simply be:

alpha=(1250/1249+1337/1336)/2=1; and
render(bg)=1*2100=2100.

According to the techniques herein, therefore, render times for every media element in the viewport can be calculated, including resources to which load handlers cannot be attached (e.g., background images, and so on) or other unmeasurable visual resources, the visually complete time will be the render time of the resource which rendered last in the viewport. That is, as mentioned above, at network and DOM activity idleness, the techniques herein will find the render time of the element which loaded last, since the rendering times for every element in the viewport is known. (That is, VCT is the point in time for the element which rendered last in the viewport.)

This is true because a browser starts rendering a resource when the resource bytes start coming in and almost finishes rendering when all the resource bytes have been downloaded. Hence, alpha is close to 1 in most of the cases, and tends to increase when the browser is performing some task other than rendering the resource (e.g., through research, generally up to alpha=2). In such instances, rendering a resource is mostly picked up in the next event loop, since rendering is the high priority task for the browser.

Figure 12:
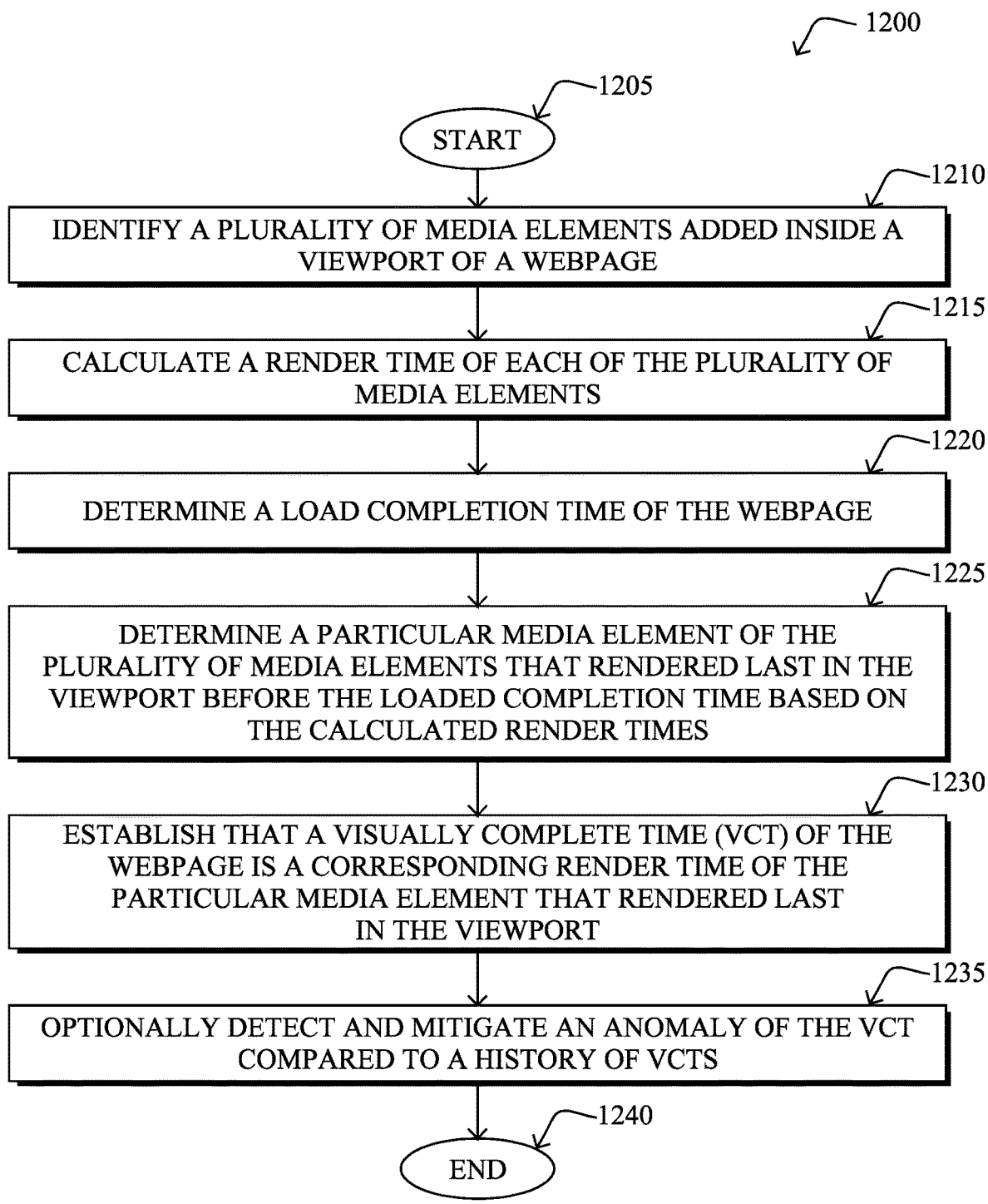
FIG. 12 illustrates an example simplified procedure for accurately determining web page visually complete time in accordance with one or more embodiments described herein.

FIG. 12 illustrates an example simplified procedure for accurately determining web page visually complete time in accordance with one or more embodiments described herein. For example, a non-generic, specifically configured device (e.g., device 200) may perform procedure 1200 by executing stored instructions (e.g., process 248). The procedure 1200 may start at step 1205, and continues to step 1210, where, as described in greater detail above, a monitoring process (e.g., an agent process as described above) identifies a plurality of media elements (e.g., image, video, scalable vector graphic (SVG), or any other inline resource or external resource loaded by the website) added inside a viewport of a webpage (e.g., a standard page or a single page application (SPA)). As described above, one technique that may be used in step 1210 is to determine coordinates of the viewport, determine coordinates of media elements added to the webpage, and identify the plurality of media elements added inside the viewport of the webpage as those media elements whose coordinates are contained within the coordinates of the viewport. As also described above, the techniques herein may further classify the plurality of media elements as being inside the viewport of the webpage in response to more than a threshold area (e.g., 20% or other determined value) of the respective media element being within the viewport.

In step 1215, the monitoring process may then calculate a render time of each of the plurality of media elements, such as by adding a load handler to each of the plurality of media elements added to the webpage. Note that where the plurality of media elements comprises one or more measurable media elements and one or more unmeasurable media elements (e.g., resources to which load handlers cannot be attached, such as background images, etc.), then calculating the render times may comprise estimating the render time of each of the one or more unmeasurable media elements based on the render time of the one or more measurable media elements. That is, as described in greater detail above, the techniques herein may calculate an average ratio ("alpha") of render time to a duration time for the one or more measurable media elements, and can then apply the average ratio to a duration time for each of the one or more unmeasurable media elements to estimate the render time of each of the respective one or more unmeasurable media elements.

Next, a load completion time of the webpage is determined in step 1220, such as based on detecting a length of network idleness or viewport inactivity after initiation of the webpage, and correlating a start of that idleness/inactivity as the load completion time of the webpage. As such, in step 1225, the techniques herein may determine a particular media element of the plurality of media elements that rendered last in the viewport before the load completion time based on the calculated render times. Therefore, in step 1230, the monitoring process may establish that a visually complete time (VCT) of the webpage is a corresponding render time of the particular media element that rendered last in the viewport, as described in greater detail above.

Optionally, in step 1235, various anomalies of the VCT may be detected compared to a history of VCTs (e.g., longer than usual individual VCT, steady VCT lengthening over time, etc.), and mitigated in a number of ways (e.g., reporting, alarming, redirecting, adjusting load balancing, etc.).

The simplified procedure 1200 may then end in step 1240.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, accurately determine web page visually complete time. In particular, unlike conventional techniques that only provide render times for measurable media elements, the techniques herein additionally calculate an accurate render time for resources to which load handlers cannot be attached (e.g., background images, etc.) as well. That is, conventional techniques treat certain unmeasurable resources, which don't have a load event, by merely using a duration from a Resource Timing API to assume their render time. However, as noted above, the duration time is not a completely accurate picture of the rendering time. The techniques herein, therefore, provide for the unique alpha correlation between duration and render time, which gives highly accurate visually complete time. Moreover, computation of alpha by taking an average over all the media elements in the page provides a smoother alpha, since there can be some resources whose alpha might get affected by CPU times, network issues, etc. Taking the average over individual alpha for all media elements smooths out the skew effect of some media elements (if any). In this manner, alpha is like a render property of a page and generally holds true for every media element on the page.

Notably, in the event there is only text in the viewport or there is some portion of text content being loaded after all the media elements, the techniques herein also keep track of text elements appearing in the viewport (e.g., using Mutation Observers in Javascript), such that if there are only text elements in the viewport or if the text element renders later, it will be the last element to render in the viewport and will be caught by the algorithm above.

Additionally, in the very rare instance that there are only background images (or other resources to which load handlers cannot be attached) in the viewport and no other media elements on the entire page, since alpha is calculated using media elements, in such rarest cases, alpha can be safely assumed to be 1. That is, during experimentations on multiple websites, it was found that alpha is mostly in the range [1, 2], and in a majority of the cases, it is close to 1.

Still further, in the event that a user navigates away from the page before the load/end time, the VCT computation algorithm above may be stopped before it is able to complete (i.e., when the user navigates away from the page). If this happens, then that stop time (e.g., stopped at X seconds) may become the page load time (X seconds) for metric tracking of length of time since the start of the page load to the navigation, but a VCT computation may be voided if it has not yet reached completion (i.e., no impartial visual renderings would count toward VCT values).

Notably, the techniques herein can be used for initial page loads and subsequent new pages (i.e., virtual pages) in single page apps (SPAs). That is, the same algorithm described above may run for the initial page load and then again for any subsequent virtual pages that are loaded.

In still further embodiments of the techniques herein, a business impact of web page visually complete time can also be quantified. That is, because of issues related to specific applications/processes (e.g., lost traffic, slower servers, overloaded network links, etc.) affecting visually complete time, various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the visually complete time with various business transactions in order to better understand the affect the visually complete time may have had on the business transactions, accordingly.

Illustratively, the techniques described herein may be performed by hardware, software, and/or firmware, such as in accordance with the illustrative visually complete time determination process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:
1. A method, comprising:
  identifying, by a monitoring process, a plurality of media elements of a webpage;
  calculating, by the monitoring process, a position of each of the plurality of media elements in relation to a viewport corresponding to a screen area of a device operable to display the webpage;
  determining, by the monitoring process and based on the calculated position of each of the plurality of media elements in relation to the viewport, that the plurality of media elements are located inside of the viewport except for at least one media element of the plurality of media elements that is determined to be located outside of the viewport;

calculating, by the monitoring process, a render time of each of the plurality of media elements except for the at least one media element that is determined to be located outside of the viewport;

determining, by the monitoring process, a load completion time of the webpage;

determining, by the monitoring process, a particular media element of the plurality of media elements that rendered last in the viewport before the load completion time based on the calculated render times; and establishing, by the monitoring process, that a visually complete time (VCT) of the webpage is a corresponding render time of the particular media element that rendered last in the viewport.

2. The method as in claim 1, wherein identifying the plurality of media elements added inside the viewport of the webpage comprises:

determining coordinates of the viewport;

determining coordinates of media elements added to the webpage; and identifying the plurality of media elements added inside the viewport of the webpage as those media elements whose coordinates are contained within the coordinates of the viewport.

3. The method as in claim 1, further comprising:

classifying the plurality of media elements as being inside the viewport of the webpage in response to more than a threshold area of the respective media element being within the viewport.

4. The method as in claim 3, wherein the threshold area is 20%.

5. The method as in claim 1, wherein the plurality of media elements comprises one or more measurable media elements and one or more unmeasurable media elements, and wherein calculating the render time of each of the plurality of media elements comprises:

estimating the render time of each of the one or more unmeasurable media elements based on the render time of the one or more measurable media elements.

6. The method as in claim 5, further comprising:

calculating an average ratio of render time to a duration time for the one or more measurable media elements; and applying the average ratio to a duration time for each of the one or more unmeasurable media elements to estimate the render time of each of the respective one or more unmeasurable media elements.

7. The method as in claim 5, wherein the unmeasurable media elements comprise resources to which load handlers cannot be attached.

8. The method as in claim 1, wherein calculating the render time of each of the plurality of media elements comprises:

adding a load handler to each of the plurality of media elements added to the webpage.

9. The method as in claim 1, wherein each of the plurality of media elements is selected from a group consisting of: an image; a video; and a scalable vector graphic (SVG).

10. The method as in claim 1, wherein determining the load completion time of the webpage comprises:

detecting a length of network idleness after initiation of the webpage; and correlating a start of the network idleness as the load completion time of the webpage.

11. The method as in claim 1, wherein determining the load completion time of the webpage comprises:

detecting a length of viewport inactivity after initiation of the webpage; and correlating a start of the viewport inactivity as the load completion time of the webpage.

12. The method as in claim 1, wherein the webpage is a single page application (SPA).

13. The method as in claim 1, further comprising:

detecting an anomaly of the VCT compared to a history of VCTs; and mitigating the anomaly.

14. A tangible, non-transitory, computer-readable medium storing program instructions that cause a computer to execute a process, comprising:

identifying a plurality of media elements of a webpage;

calculating a position of each of the plurality of media elements in relation to a viewport corresponding to a screen area of a device operable to display the webpage;

determining, based on the calculated position of each of the plurality of media elements in relation to the viewport, that the plurality of media elements are located inside of the viewport except for at least one media element of the plurality of media elements that is determined to be located outside of the viewport;

calculating a render time of each of the plurality of media elements except for the at least one media element that is determined to be located outside of the viewport;

determining a load completion time of the webpage;

determining a particular media element of the plurality of media elements that rendered last in the viewport before the load completion time based on the calculated render times; and establishing that a visually complete time (VCT) of the webpage is a corresponding render time of the particular media element that rendered last in the viewport.

15. The computer-readable medium as in claim 14, wherein the process further comprises:

classifying the plurality of media elements as being inside the viewport of the webpage in response to more than a threshold area of the respective media element being within the viewport.

16. The computer-readable medium as in claim 14, wherein the plurality of media elements comprises one or more measurable media elements and one or more unmeasurable media elements, and wherein calculating the render time of each of the plurality of media elements comprises:

estimating the render time of each of the one or more unmeasurable media elements based on the render time of the one or more measurable media elements.

17. The computer-readable medium as in claim 14, wherein determining the load completion time of the webpage comprises:

detecting one of either a length of network idleness or a length of viewport inactivity after initiation of the webpage; and correlating one of either a start of the network idleness or a start of the viewport inactivity as the load completion time of the webpage.

18. The computer-readable medium as in claim 14, wherein the webpage is a single page application (SPA).

19. The computer-readable medium as in claim 14, wherein the process further comprises:

detecting an anomaly of the VCT compared to a history of VCTs; and mitigating the anomaly.

20. An apparatus, comprising:
one or more network interfaces to communicate with a network;
a processor coupled to the network interfaces and configured to execute one or more processes; and
a memory configured to store a process executable by the processor, the process when executed configured to:
identify a plurality of media elements of a webpage;
calculate a position of each of the plurality of media elements in relation to a viewport corresponding to a screen area of a device operable to display the webpage;
determine, based on the calculated position of each of the plurality of media elements in relation to the viewport, that the plurality of media elements are located inside of the viewport except for at least one media element of the plurality of media elements that is determined to be located outside of the viewport;
calculate a render time of each of the plurality of media elements except for the at least one media element that is determined to be located outside of the viewport;
determine a load completion time of the webpage;
determine a particular media element of the plurality of media elements that rendered last in the viewport before the load completion time based on the calculated render times; and
establish that a visually complete time (VCT) of the webpage is a corresponding render time of the particular media element that rendered last in the viewport.

* * * * *

UNITED STATES PATENT AND TRADEMARK OFFICE
CERTIFICATE OF CORRECTION

PATENT NO. : 11,075,977 B2
APPLICATION NO. : 16/440484
DATED : July 27, 2021
INVENTOR(S) : Shubham Jindal It is certified that error appears in the above-identified patent and that said Letters Patent is hereby corrected as shown below:

In the Specification

Column 7, Line 24, please amend as shown:
the mobile application. Mobile RUM provides informa- Column 10, Line 64, please amend as shown:
the techniques herein. The system 400 in FIG. 4 includes Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*